April 18, 1967 J. R. HAGAN 3,314,732
APPARATUS FOR BLOWING INSULATION
Filed Nov. 27, 1964 2 Sheets-Sheet 2

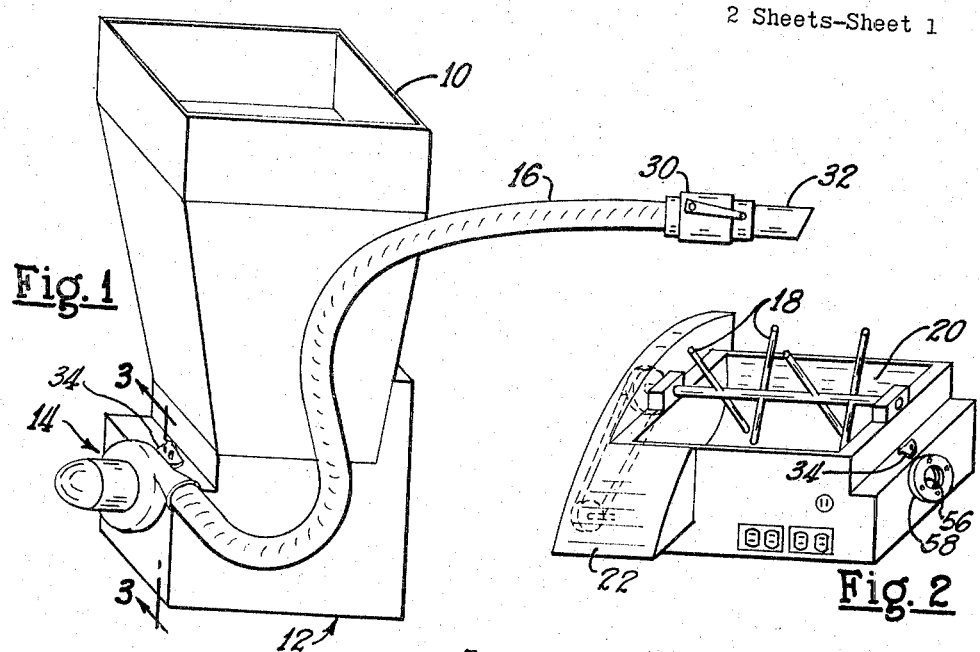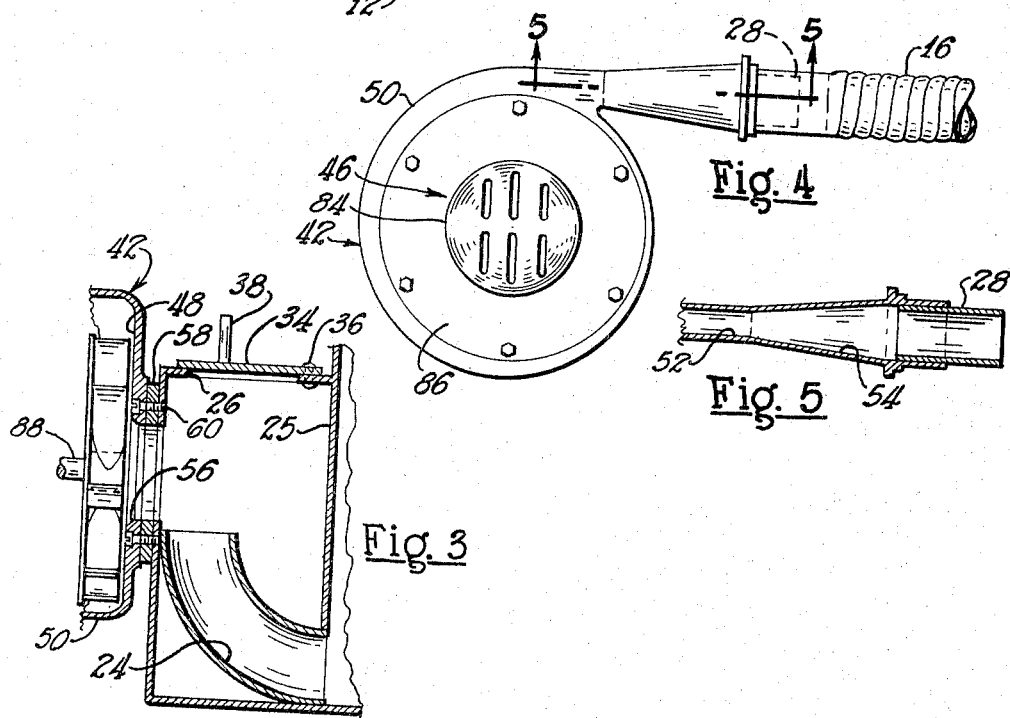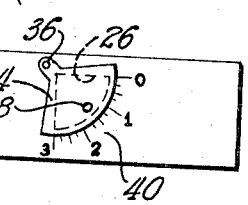

INVENTOR.
JAMES R. HAGAN
BY
ATTORNEYS

United States Patent Office 3,314,732
Patented Apr. 18, 1967

3,314,732
APPARATUS FOR BLOWING INSULATION
James R. Hagan, Toledo, Ohio, assignor to Electra Manufacturing Corp., Toledo, Ohio, a corporation of Ohio
Filed Nov. 27, 1964, Ser. No. 414,261
3 Claims. (Cl. 302—37)

This invention relates to apparatus for insulating buildings and the like and more particularly to a blower for moving insulation from a source of supply to a space to be insulated.

Particularly with the rise in the number of houses heated by electricity, the demand for blown insulation has risen accordingly. While insulation has been blown heretofore from a source of supply to a space to be insulated, considerable power has been required for moving a relatively small volume of the insulation. Insulation of this nature is of low density, rendering it difficult to transport without using an unduly large quantity of power.

The present invention provides a high-speed rotary blower for moving a fluidized stream of the insulation from a source to a space to be insulated. The blower according to the invention includes an impeller with blades desigend or shaped so as to enable a much larger volume of insulation to be blown for a given amount of power. The new blower has enabled the volume of insulation blown to be substantially doubled with only a slight increase in horsepower to drive the impeller.

The blower provided by the invention also is designed to substantially eliminate the possibility of the material plugging and blocking the blower and particularly the blower outlet.

It is, therefore, a principal object of the invention to provide apparatus for blowing large quantities of insulation with a comparatively small amount of power.

Another object of the invention is to provide an insulation blower capable of handling larger quantities of insulation without plugging.

Other objects and advantages of the invention will be apparent from the following detailed description of a preferred embodiment thereof, reference being made to the accompanying drawing, in which:

FIG. 1 is a front view in perspective of a hopper, a base, a blower, a hose, and a valve according to the invention;

FIG. 2 is a rear view in perspective of the base shown in FIG. 1;

FIG. 3 is a fragmentary view in cross section taken along the line 3—3 of FIG. 1 showing the blower and the inlet in relation to the hopper;

FIG. 4 is a view in elevation of a housing of the blower;

FIG. 5 is a fragmentary view in horizontal cross section of the blower housing, taken along the line 5—5 of FIG. 4;

FIG. 8 is a top view of the inlet of FIG. 3, showing an air control arrangement.

Figure 6:
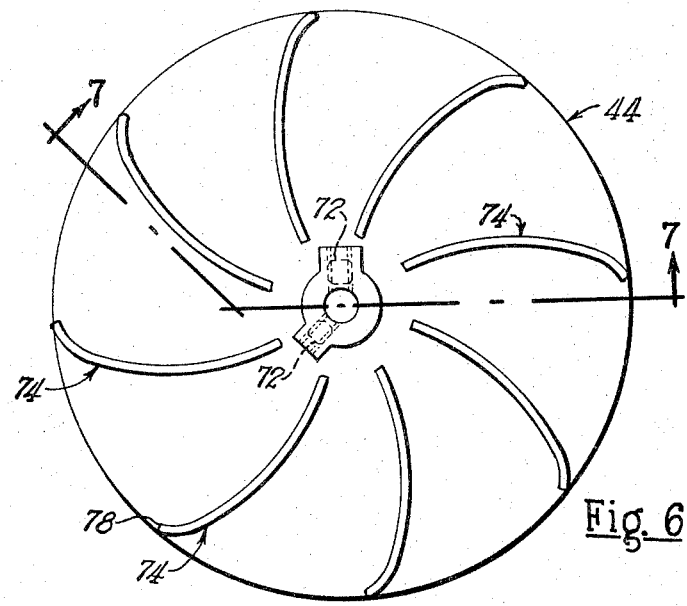
FIG. 6 is a view in elevation of an impeller of the blower.

Referring to the drawings and more particularly to FIGS. 1 and 2, the overall apparatus for transporting insulation to a space includes a hopper 10, a feeder base 12, a blower assembly 14, and a flexible hose 16. More specifically, the hopper 10 is sufficiently large to hold at least two bags of blowing wool or insulation which moves downwardly in the hopper 10 by gravity. The insulation is kept from packing by an agitator 18 which is rotatably mounted in a receptacle 20 of the base 12 and is driven by a motor mounted under a housing 22 on the back of the base 12. The insulation is then sucked through an inlet passage 24 and an inlet chamber 25 to the blower assembly 14, the passage having an air opening 26 which can be adjusted to regulate the volume of insulation pulled through the passage 24. The insulation is then blown by the blower assembly 14 through a hose connection 28, the hose 16, a control valve 30, and a nozzle 32 which is projected into the space to be insulated. The valve 30 can be opened and closed by the operator to regulate flow of the insulation. The nozzle 32, which can be of a number of suitable shapes, can be inserted through an opening cut in wallboard or other construction panel so as to enable the space between the inner and outer walls of a house to be filled with the insulation, there being one of the openings between each pair of studs.

The air opening 26 (FIGS. 3 and 8) for the inlet passage 24 is of generally triangular shape with an arcuate base and is closed off by a valve plate 34 of similar shape but slightly larger. The valve plate 34 is pivotally connected by a pin 36 to the base 12 near the peak of the opening 26 and has a suitable projection or handle 38 to facilitate positioning the plate. A curved scale 40 is also located adjacent the arcuate edge of the opening 26 to enable the valve plate 34 to be set in any predetermined position. The triangular shape of the plate and opening is very effective in closely controlling the amount of air passing through the opening according to the pivotal position of the valve plate.

The blower assembly 14 basically comprises three units, including a blower housing 42, an impeller 44, and a drive unit 46. The housing 42 has a flat inlet wall 48 and a generally cylindrical peripheral wall 50 integral therewith, the wall 50 having an outlet opening 52 communicating with an outlet passage 54. The passage 54 flares from the opening 52 in both a horizontal plane and in a vertical plane to substantially eliminate the possibility of insulation being caught therein and plugging the outlet opening or passage. The housing 42 also has a central inlet opening 56 which communicates with the inlet passage 24, being spaced therefrom by a connecting flange member 58. The wall 48 of the housing is affixed to the base 12 with the flange member 58 therebetween by means of a plurality of machine screws 60 which are recessed in the wall 48 to prevent any interference with the operation of the blower. The particular connection for the blower assembly 14 is effective to prevent theft of the blower and drive units as has heretofore been possible with the bayonet type of connection which was quickly detachable. With the new connection, the blower assembly can be removed from the base 12 only by removing the screws used to affix the drive unit 46 to the blower housing 42 and the four screws 60 used to affix the housing 42 to the base 12.

Figure 7:
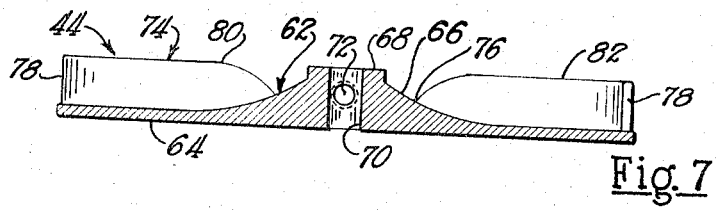
FIG. 7 is a view in vertical cross section of the impeller, taken along the line 7—7 of FIG. 6.

Referring more particularly to FIGS. 6 and 7, the impeller 44 includes a base 62 with a circular periphery and a flat rear surface 64. The opposite side of the base 62 presents a smooth flowing surface 66 flaring outwardly away from the base 62 to a plateau or peak portion 68 near the center thereof. The base 62 also includes a central drive shaft opening 70 to receive a drive shaft which is held thereon by two setscrews 72. The impeller 44 also includes eight impeller blades 74 extending generally radially and spaced at equal distances around the impeller. The inner ends of the blades 74 terminate at points 76 short of the peak 68 while outer ends 78 are squared off at the periphery of the impeller. Beginning at portions designated 80 and extending radially inwardly, the blades taper down to the points 76 with the portions 80 being at least two-thirds the length of the blades in from the outer ends 78 or not more than one-third the length of the blades out from the points 76. On the other hand, the portions 80 must not be more than five-sixths the length of the blades in from the outer ends and not less than one-sixth the distance out from the points 76. By so tapering the inner ends of the blades, more space is provided adjacent the insulation inlet 56 to receive the insulation without danger of choking or plugging. Also, with the gentle slope or flare of the impeller surface 66, a more gradual path is provided for the insulation and again the danger of plugging is reduced.

It is also important that outer longitudinal edges 82 of the blades 74 extending outwardly from the portions 80 are substantially parallel to the rear base surface 64. Also, the width of the blades from the outer ends 78 to the portions 80 is substantially uniform or constant. The blades also are at least as wide at their outer ends 78 as at the inner ends or even at the portions 80. At their inner portions, the blades 74 extend substantially radially and then curve rearwardly with the radius of curvature decreasing toward the outer ends at a substantially uniform rate.

These particular characteristics of the blades are important in achieving a much larger output for the blower assembly 14 than has heretofore been possible. Blowers and particularly impellers heretofore known have been designed primarily for vacuum cleaners with the main purpose of moving large quantities of air with relatively small quantities of solid materials. As such, the blades heretofore known have tapered from their central portions to the peripheries of the impellers with the peripheral ends being quite narrow. With the blades according to the invention, however, it has been found that the volume of insulation capable of being blown can be greatly increased for only a slight increase in power. For example, in one size of blower, the amount of insulation blown has been doubled with only a twenty-five percent increase in horsepower.

The drive unit 46 for the blower assembly is of substantially known design and includes a motor 84 and a cover plate 86 which is fastened by machine screws to the blower housing 42 and provides a flat inner surface for the housing, adjacent the base 64 of the impeller 44. A drive shaft 88 extends from the motor 84 through the cover plate 86 and through the opening 70 in the impeller 44, being fastened thereto by the setscrews 72.

Various modifications of the above described embodiment of the invention will be apparent to those skilled in the art and it is to be understood that such modifications can be made without departing from the scope of the invention, if they are within the spirit and the tenor of the accompanying claims.

What I claim is:

1. Means for moving fibrous insulation from a source of supply to a space to be insulated, said means comprising a housing having a flat sidewall of circular shape with a central opening, an integral peripheral wall around said sidewall and of generally cylindrical shape except for an outlet opening at one portion thereof, wall means forming a flared exit passage communicating with said outlet opening and flaring both horizontally and vertically therefrom, said exit passage terminating in a circular opening, a cover plate attached to said peripheral wall and disposed parallelly to said sidewall, a motor mounted on said cover plate and having a drive shaft extending through said cover plate and aligned with said central opening, an impeller affixed to said drive shaft and comprising a base having a flat surface, a circular periphery, and a surface opposite to said flat surface which flares to a peak aligned with said central opening, a plurality of blades integral with said base and extending generally radially, the inner ends of said blades terminating radially outwardly from said peak and the outer ends of said blades terminating at the periphery of said base, outer end portions of said blades curving rearwardly in a direction opposite to the direction of rotation of said impeller with the radius of curvature decreasing substantially uniformly from the inner to the outer ends of said blades, the outer longitudinal edges of said blades being a distance from said base at their outer ends at least equal to the distance from the base at their inner ends, and a hose communicating with said outlet opening.

2. Appartus according to claim 1 characterized by means forming an inlet passage communicating with said central opening of said housing and said source of supply, means forming an opening communicating with said inlet passage, a valve plate pivotally attached to said inlet passage means adjacent said opening, and a scale adjacent said opening to enable said valve plate to be disposed in a predetermined position.

3. Apparatus according to claim 2 wherein said air opening and said valve plate are of similar, generally triangular configuration and said pivotal connection for said valve member is adjacent corresponding angles of the triangles.

References Cited by the Examiner
UNITED STATES PATENTS

| | | |
|---|---|---|
| 877,191 | 1/1908 | Hanson. |
| 1,498,409 | 6/1924 | Walsh _____ 302—37 |
| 1,548,082 | 8/1925 | Wise et al. _____ 230—134.45 |
| 1,903,304 | 4/1933 | Wenzel _____ 302—36 |
| 2,291,871 | 8/1942 | Bokum et al. |
| 3,028,181 | 4/1962 | Thompson et al. |
| 3,171,692 | 3/1965 | Beery _____ 302—36 |
| 3,185,099 | 5/1965 | Spring. |

ANDRES H. NIELSEN, *Primary Examiner.*